United States Patent [19]

Husbands

[11] 4,449,043
[45] May 15, 1984

[54] OPTICAL POWER SOURCE CONTROL SYSTEM

[75] Inventor: Charles R. Husbands, Acton, Mass.

[73] Assignee: The United States of America as represented by the Secretary of the Air Force, Washington, D.C.

[21] Appl. No.: 316,703

[22] Filed: Oct. 30, 1981

[51] Int. Cl.³ .......................... G01J 1/32; G02B 5/14
[52] U.S. Cl. .................................. 250/205; 250/227; 455/612; 455/618; 350/96.15
[58] Field of Search ................ 250/205, 227; 455/618, 455/612, 606, 619; 350/96.15

[56] References Cited

U.S. PATENT DOCUMENTS

| | | | |
|---|---|---|---|
| 2,679,595 | 5/1954 | Spencer | 250/36 |
| 3,069,624 | 12/1962 | Friedman | 325/151 |
| 3,943,573 | 3/1976 | Budmiger | 2/8 |
| 4,032,860 | 6/1977 | LeVeen | 331/63 |
| 4,054,366 | 10/1977 | Barroski et al. | 350/96.15 |
| 4,076,375 | 2/1978 | Muska et al. | 350/96.15 |
| 4,281,245 | 7/1981 | Brogardh et al. | 250/205 |

Primary Examiner—David C. Nelms
Assistant Examiner—J. Brophy
Attorney, Agent, or Firm—Donald J. Singer; Jacob N. Erlich

[57] ABSTRACT

An optical power source control system having a four port optical coupler, an optical receiver and associated comparator circuits operably connected to the optical transmission line connecting the source to an output connector. When the output connector is mated with another connector, the receiver senses the optical energy reflected from the glass/air and air/glass interfaces of the connectors and provides an appropriate signal. This signal is sufficiently high when compared to a threshold voltage level to permit the power source to operate. When the output connector is in the unmated condition the reflected optical power from the air/glass interface is no longer present and therefore the signal from the receiver falls below the threshold voltage level. With this reduced signal level, power flow to the optical source is removed or reduced thereby controlling the operation of the optical power source.

8 Claims, 1 Drawing Figure

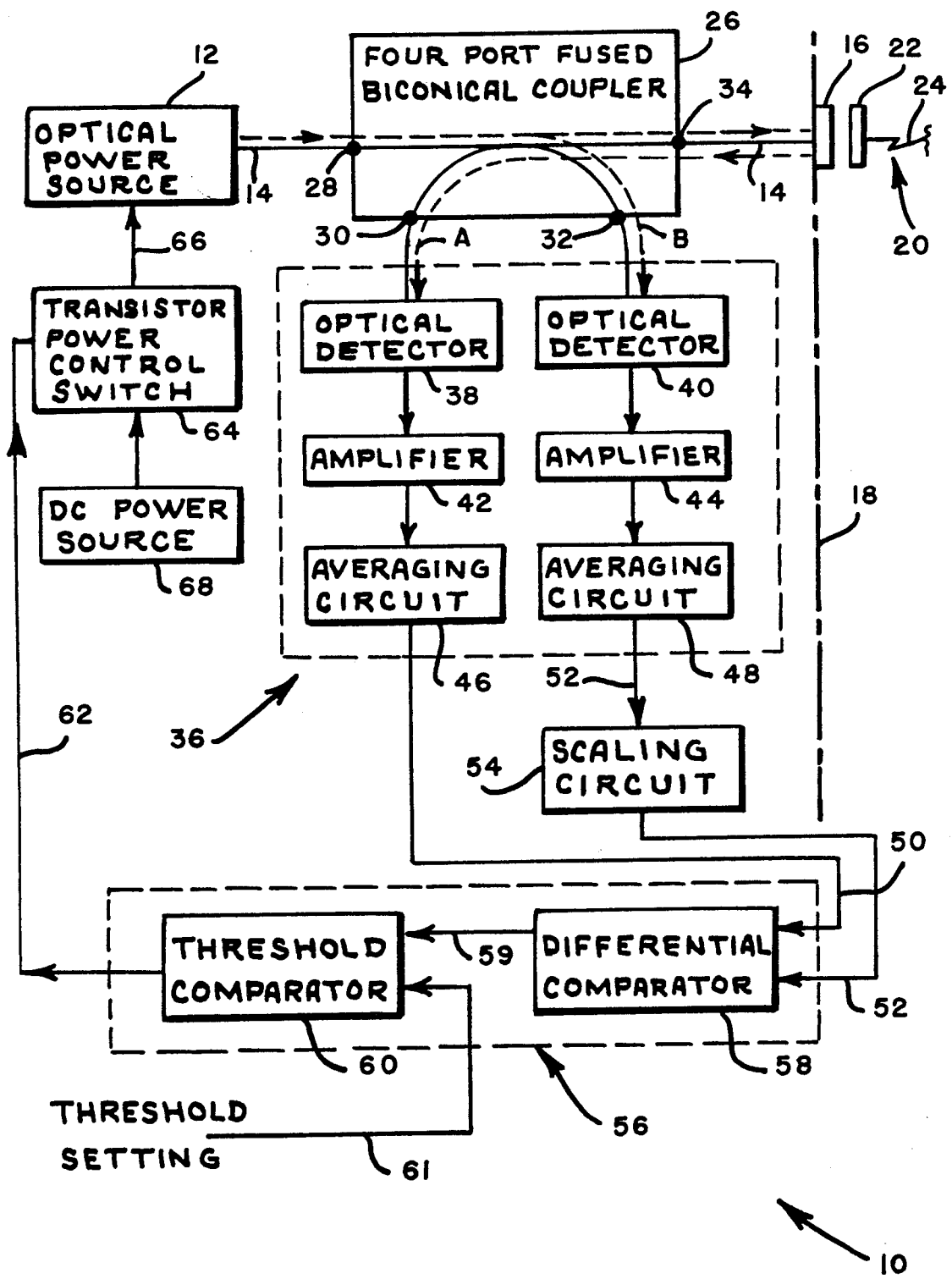

OPTICAL POWER SOURCE CONTROL SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical power sources, and, more particularly, to a control system for varying the output of an optical power source.

In today's use of high power fiber optic systems, a major concern has developed with respect to the radiation hazard of unmated optical connectors. Of greatest concern is the threat of eye exposure which may result from such unmated connector interfaces. In fact, state and federal governments are currently working on legislation to register high power optical sources and mandate mechanical interlock on devices containing such sources in order to reduce the hazard associated therewith.

The power levels required to produce injury is currently present in most operating systems and in particular in military fiber optic systems where this hazard occurs at shelter walls from unmated connectors remote from the transmitting source. The potential hazard is substantially increased as current sources of optical power operate in the infrared portion of the spectrum and the presence or absence of radiation is not perceivable to the unaided observer. Consequently, there is developing a greater need for a control system which is capable of substantially reducing this hazard in an economical and reliable manner.

SUMMARY OF THE INVENTION

The instant invention overcomes the problems encountered in the past and as set forth in detail hereinabove by providing an optical power source control system which is capable of minimizing the safety hazard, automatically modifying the optical power due to system degradation, and allowing the lifetime of the device to be extended by adjusting the required optical power to needs of the overall optical system.

In general optical power systems incorporate therein a suitable optical power source such as a laser in which the power output therefrom is transmitted by means of an optical fiber to a cable transmission assembly by a pair of mating connectors. It is the unmated condition of a connector which poses the most serious safety hazards, in that the output from the optical source (which is generally in the infrared wavelength range) can cause irreparable eye damage.

To alleviate this potential danger, the instant invention incorporates between the optical power source and the optical connector a device which is capable of transmitting to an optical receiver a portion of the output power as well as backscattered energy which is developed between the glass to air and air to glass interfaces between adjacent connectors. An example of such a device which may be used with the present invention is a four port optical coupler. A comparison signal between the output power and the backscattered energy is utilized to control the power source.

During operation, energy which is emitted from the optical power source passes through the four port optical coupler and appears at the optical connector. If the connector is unmated approximately 4% of the incident energy will be backscattered by the glass to air interface back into the optical coupler. This backscattered energy as well as a portion of the output energy is detected by an optical receiver. The resulting voltage difference is determined and compared against a predetermined threshold level in an appropriate threshold and control logic circuit.

If a cable assembly is mated to the connector, some of the transmitted energy will also be reflected by the air to glass surface of the mating section back into the optical coupler. This backscattered energy also amounts to about 4% of the incident energy and takes the same transmission path as that described for the energy scattered off the glass to air interface of the unmated connector. Therefore, the backscattered optical power detected by the receiver from the optical coupler will vary in accordance with the mated or unmated condition. If the resultant voltage level produced by the optical receiver varies sufficiently from the mated to the unmated condition, the output can be thresholded and the operating state of the optical power source can be controlled.

It is therefore an object of this invention to provide an optical power source control system which is capable of automatically disabling the high power optical source when the transmission system is interrupted or modified.

It is another object of this invention to provide an optical power source control system which is capable of regulating the output power from the power source.

It is a further object of this invention to provide an optical power source control system which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

The only FIGURE of the drawing is a schematic representation of the optical power source control system of this invention.

DETAILED DESCRIPTION OF THE PREFERRED EMBODIMENT

Reference is now made to the only FIGURE of the drawing which illustrates schematically the optical power source control system 10 of this invention. Making up system 10 is any conventional optical power source 12 in the form of, for example, a conventional continuous or pulsed laser or high radiant energy LED. Interconnected to optical source 12 is an optical transmission line 14 in the form of, for example, an optical fiber. Transmission line 14 terminates in a conventional optical connector 16. Connector 16 in most instances is fixed or secured to a wall 18 or the like and, in the unmated condition is exposed so as to constitute a health, or, more particularly, an eye hazard.

During use of the optical power source 12 a cable transmission assembly 20 or the like having an optical connector 22 secured at one end thereof is matingly connected with optical connector 16 in a manner shown in the drawing. The cable transmission assembly is connected at its further end 24 to any suitable device (not shown) which utilizes the power emitted from the optical power source 12. In some instances a plurality of cable transmission assemblies 20 can be interconnected to each other thereby substantially expanding the point at which the output power from source 12 can be utilized.

Under ordinary circumstances the power being emitted from optical power source 12 is a continual source of power irregardless of whether or not connectors 16 and 22 are interconnected. As a result optical energy (generally in the infrared range) is continually being emitted from connector 16. This constitutes a severe health problem if connector 16 is unmated since the output energy can have a lasting affect on the eye and cause permanent retina damage.

To alleviate this problem the present invention incorporates within the transmission line 14 a device capable of transmitting therefrom both a portion of the output energy from source 12 and backscattered energy which is developed between the glass to air interface of an unmated connector 16 as well as the backscattered energy developed between the air to glass interface of a mated connector 22. One such device which finds applicability with this invention is a conventional four port fused biconical coupler 26 of the type manufactured by Canstar Corporation of Canada or Hughes Corporation.

Coupler 26 is made up of a pair of twisted and fused optical fibers which create four optical ports 28, 30, 32 and 34. Two of the ports, 28 and 34, optically connect coupler 26 to transmission line 14. Port 30 is utilized to redirect backscattered energy (arrow A) to an optical receiver circuit 36 while port 32 directs a portion of output energy (arrow B) to optical receiver circuit 36 in a manner described in detail below.

Optical receiver circuit 36 is made up of a pair of conventional optical detectors 38 and 40, their associated amplifiers 42 and 44, and conventional averaging circuits 46 and 48 to compensate for variations in amplitude caused by digital signals. The detectors 38 and 40 may be in the form of PIN diodes while the amplifiers 42 and 44 may be transimpedance amplifiers. As clearly illustrated by arrow A in the drawing detector 38 receives optical energy reflected from the unmated glass/air and mated air/glass interface of connectors 16 and 22. Detector 40, on the other hand receives a portion of the optical energy produced by optical source 12 and depicted by arrow B.

If the reflected and direct paths A and B, respectively, are equal in length then the two outputs 50 and 52 from receiver circuit 36 will be in phase but unequal in amplitude. A conventional scaling circuit 54 is connected to the output 52 from detector 40, amplifier 44 and averaging circuit 48 in order to scale output 52 equal in amplitude to output 50 when connectors 16 and 22 are in the unmated condition.

Output signals 50 and 52 are received by a threshold and logic circuit 56 made up of a conventional differential comparator 58 and threshold comparator 60. The output 62 from threshold and logic circuit 56 is input into a conventional transistor power control switch 64 which controls the DC power 66 from DC power source 68 applied to operate optical power source 12.

MODE OF OPERATION

More specifically, during operation of the optical power source control system 10 of this invention, electromagnetic energy, generally in the infrared range, is emitted from optical power source 12 and passes through optical fiber 14 and optical coupler 26 appearing as an output at optical connector 16, with a portion thereof being output at port 32 (arrow B). If connector 16 is unmated approximately 4% of the incident energy emitted therefrom will be backscattered by the glass to air interface at connector 16 back into optical coupler 26. This backscattered energy (arrow A) will be output at port 30 of coupler 26. Optical receiver circuit 36 receives the energy emitted at ports 30 and 32, and provides output signals 50 and 52, respectively. As stated hereinabove, with connectors 16 and 22 unmated output signal 52 can be scaled by scaling circuit 54 such that the resulting signals 50 and 52 applied to differential comparator 58 will be equal in amplitude. Therefore, the output 59 of differential comparator 58 with connector 16 in the unmated condition will be substantially zero.

If a cable assembly 20 is mated to connector 16, some of the transmitted energy will also be reflected by the air to glass surface of the mating connector 22. This backscattered energy also amounts to about 4% of the incident energy. This additional backscattered energy will take the same transmission path A through optical coupler 26 as that described for the energy scattered off the glass to air interface of unmated connector 16. Therefore, the optical energy received by detector 38 will be greater, by approximately a factor of two, than the power received when the optical source 12 was in the unmated condition.

Stated more succinctly, the additional reflected energy will raise the optical energy as seen by detector 38 by approximately 3 db. The increased optical signal will increase the level of output voltage 50 and cause the output 59 of differential comparator 58 to be raised from the zero level to some positive voltage level.

This output 59 of comparator 58 is applied as the input of threshold comparator 60. If the signal level from differential comparator 58 exceeds the established threshold signal 61 of threshold comparator 60, a fixed level signal 62 will be generated. This signal 62 from threshold comparator 60 is applied to transistor switch 64 which is used to control the DC power 68 applied to optical power source 12. Therefore, if connectors 16 and 22 are mated, the level of the signal 59 generated by differential comparator 58 will exceed the established level of threshold comparator 60. The output signal 62 from threshold comparator 60 will permit transistor control switch 64 to conduct and maintain the proper DC level on power source 12.

If at some time thereafter connectors 16 and 22 become unmated, the reflected optical energy will decrease. In turn, the output signal 59 from differential comparator 58 will go back to zero and the signal 59 observed by threshold comparator 60 will drop below the established threshold level. The output 62 of threshold comparator 60 will drop shutting off transistor switch 64 and the DC power to optical power source 12 will be removed.

To reinitiate operation, the unmated connectors 16 and 22 must be attached. The transistor switch 64 must then be returned to the conducting state so that DC power can be reapplied to source 12. If all the conditions in the loop are correct, the power source 12 will operate properly while the connectors 16 and 22 are mated and automatically shut down if the connection is interrupted.

An example of an operable embodiment of this invention could include a 75/5 four port coupler 26. Measurable output power at port 30 for a 1 milliwatt optical power source 12 would be approximately 1.5 microwatts with connector 16 in the unmated condition. For a mated connector 16, the measurable power level at port 30 would be approximately 2.6 microwatts. It should be realized that this calculation is based solely on the energy backscattered from the glass to air and the air to glass interfaces and does not include energy backscattered from any additional cable transmission assemblies and subsequent couplers.

It should be further realized that when additional cable transmission assemblies 20 are utilized with this invention, a subsequent increase in output power at port 30 will be received by detector 38. Under those conditions it would be appropriate to alter the threshold voltage 61 of threshold comparator 60 so as to accommodate a greater voltage input from differential comparator 58. Such an arrangement would be desirable to detect the separation of one of the plurality of cable transmission assemblies far a field. The appropriate control of the output power from optical power source 12 could therefore be performed accordingly. As is clearly apparent from the above description, the adjustments which are made by the control system 10 of this invention affect the actual optical power source 12 and no adjustments of power are made at the output end. Consequently a completely safe optical power source system can be effected.

Although this invention has been described with reference to a particular embodiment, it will be understood that this invention is also capable of further and other embodiments within the spirit and scope of the appended claims.

I claim:

1. An optical power source control system comprising:
   means for providing a source of optical energy;
   means optically connected at one end thereof to said optical energy providing means for transmitting said optical energy to a preselected location removed from said energy source;
   means connected to the other end of said transmitting means for connecting said transmitting means to an energy receiving means at said preselected location;
   an optical coupler interconnected with said transmitting means, said optical coupler including means for permitting said optical energy to pass therethrough, means for receiving energy reflected from said connecting means and for transmitting said reflected energy has a first output therefrom, and means for transmitting a portion of said energy passing through said coupler as a second output therefrom;
   means operably connected to said optical coupler for receiving said first output and said second output from said optical coupler and for compensating for any variations in amplitude in said first output and said second output, and for emitting a first compensated output signal and a second compensated output signal therefrom;
   means operably connected to said compensating means for receiving said first compensated output signal and said second compensated output signal therefrom and comparing said first compensated output signal with said second compensated output signal in order to produce a reflected energy signal, and for emitting said reflected energy signal therefrom; and
   means operably connected between said reflected energy signal emitting means and said optical energy providing means for comparing said reflected energy signal with a predetermined signal and for providing a comparison signal to said optical energy providing means to control the output of said optical energy providing means whereby said comparison signal is indicative of whether or not said connecting means is connected to said energy receiving means.

2. An optical power source control system as defined in claim 1 wherein said means for providing a source of optical energy comprises a laser, means for providing DC power to said laser and means interconnected between said laser and said DC power providing means controlling the input of said DC power to said laser, said comparison signal providing means being connected to said DC power controlling means.

3. An optical power source control system as defined in claim 2 wherein said compensating means for receiving said outputs from said optical coupler comprises a pair of photodetectors and said means for comparing said outputs comprises a differential comparator.

4. An optical power source control system as defined in claim 3 wherein said compensating means for receiving said outputs from said optical coupler further comprises a pair of amplifiers, a pair of averaging circuits and a scaling circuit.

5. An optical power source control system as defined in claim 4 wherein said means for comparing said reflected energy signal with a predetermined signal comprises a threshold comparator.

6. An optical power source control system as defined in claim 1 wherein said optical coupler comprises a four port fused biconical optical coupler.

7. An optical power source control system as defined in claim 5 wherein said optical coupler comprises a four port fused biconical optical coupler.

8. An optical power source control system as defined in claim 7 wherein said DC power controlling means comprises a transistor power control switch.

* * * * *